United States Patent
Dahlgren et al.

(10) Patent No.: US 12,026,307 B2
(45) Date of Patent: Jul. 2, 2024

(54) PERSONAL DEVICE ACTIVATION AND UNLOCKING USING GAZE TRACKING

(71) Applicant: Telefonaktiebolaget LM Ericsson (publ), Stockholm (SE)

(72) Inventors: Fredrik Dahlgren, Lund (SE); Alexander Hunt, Tygelsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/924,797

(22) PCT Filed: May 19, 2020

(86) PCT No.: PCT/EP2020/063902
§ 371 (c)(1),
(2) Date: Nov. 11, 2022

(87) PCT Pub. No.: WO2021/233528
PCT Pub. Date: Nov. 25, 2021

(65) Prior Publication Data
US 2023/0176648 A1 Jun. 8, 2023

(51) Int. Cl.
*G06F 3/01* (2006.01)
*G06F 3/14* (2006.01)
*G06F 21/36* (2013.01)
*G06V 20/60* (2022.01)

(52) U.S. Cl.
CPC ............... *G06F 3/013* (2013.01); *G06F 3/14* (2013.01); *G06F 21/36* (2013.01); *G06V 20/60* (2022.01); *G06V 2201/02* (2022.01)

(58) Field of Classification Search
CPC ............ G06F 3/013; G06F 3/041–047; G06F 2203/041–04114; G06F 21/32; G06V 40/19; G06V 40/18; H04N 23/611
See application file for complete search history.

(56) References Cited

U.S. PATENT DOCUMENTS

| 9,948,729 B1* | 4/2018 | Ekambaram .......... H04L 67/148 |
| 2013/0135196 A1 | 5/2013 | Park et al. |
| 2013/0300652 A1 | 11/2013 | Raffle et al. |
| 2013/0342672 A1* | 12/2013 | Gray ..................... H04W 12/06 348/78 |

(Continued)

OTHER PUBLICATIONS

Velloso, Eduardo, et al., "AmbiGaze: Direct Control of Ambient Devices by Gaze", Public Displays, DIS 2016, Brisbane, Australia, Jun. 4-8, 2016, pp. 812-817.

*Primary Examiner* — Sanjiv D. Patel
(74) *Attorney, Agent, or Firm* — Murphy, Bilak & Homiller, PLLC (57) ABSTRACT

A method (200) of activating a display screen of a device, includes establishing (201) a connection with each of one or more candidate display screens (119). A direction of gaze (121) of an eye of a user (117) is tracked (203), and a display screen (119) is selected (207) from the one or more candidate display screens when (205) the display screen (119) is in the direction of gaze (121) of the eye of the user (117). A confirmation code (305) is caused (209) to be displayed on the selected display screen and an image of the selected display screen is obtained. The selected display screen is activated (215) in response to detecting (213) the confirmation code (305) in the updated image of the selected display screen.

24 Claims, 6 Drawing Sheets

(56) References Cited

U.S. PATENT DOCUMENTS

| | | |
|---|---|---|
| 2014/0132508 A1 | 5/2014 | Hodge et al. |
| 2014/0267034 A1 | 9/2014 | Krulce et al. |
| 2016/0231812 A1 | 8/2016 | Hansen et al. |
| 2016/0259977 A1* | 9/2016 | Asbun .................... H04W 4/30 |
| 2018/0284887 A1 | 10/2018 | Fan et al. |

* cited by examiner

PERSONAL DEVICE ACTIVATION AND UNLOCKING USING GAZE TRACKING

BACKGROUND

The present invention relates to technology for activating and unlocking personal devices, and more particularly to technology that uses gaze tracking as a basis for activating and/or unlocking personal devices.

Display devices are employed in many different kinds of technology such as televisions, computer displays, computing tablets, communication devices, and smart watch technology, to name just a few. Most display devices remain on unless manually turned off or allowed to eventually go into a "sleep" mode after some period in which no interaction with the user is detected. In some devices, such as smartphones and smartwatches, the display is activated in response to detected movements of the device or events (e.g., reception of messages).

The inventors of the herein-described technology have recognized that there is a problem with conventional technology in that it shows content when the display is not being observed. So, for example, a smart watch will light up when a wake-up gesture is made, potentially at notifications, or when it is manually turned on, even if the user is not looking at the device. This happens occasionally by mistake. Further, there is a chance that once a user has finished a task on the device it will still be active for a while.

Having the display activated when the user is not looking at it is wasteful of energy. Furthermore, received messages or notifications might be shown on the display even if the user is not watching and the device display is visible to the general public, and this poses a security and/or privacy risk.

There is therefore a need for technology that addresses the above-mentioned and related problems.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology (e.g., methods, apparatuses, nontransitory computer readable storage media, program means) that activates a display screen of a device. This involves establishing a connection with each of one or more candidate display screens. A direction of gaze of an eye of a user is tracked, and a display screen is selected from the one or more candidate display screens when said display screen is in the direction of gaze of the eye of the user. A confirmation code is caused to be displayed on the selected display screen and an image of the selected display screen is obtained. The selected display screen is activated in response to detecting the confirmation code in the updated image of the selected display screen.

In some but not necessarily all embodiments, selecting the display screen from the one or more candidate display screens when said display screen is in the direction of gaze of the eye of the user comprises obtaining a field of view image comprising images of one or more display screens within a field of view of the user. One of the images of the one or more display screens within the field of view of the user is selected when said one of the images is in the direction of gaze of the eye of the user. The selected image is analyzed to detect device type information of the selected display screen image. Device type information of said one or more of the candidate devices is obtained and correlated with the detected device type information of the selected image. A candidate display screen having a device type that is most correlated with the detected device type information of the selected display screen image is selected.

In some but not necessarily all embodiments, obtaining device type information of said one or more of the candidate devices comprises receiving the device type information via the respective connection with said one or more of the one or more candidate devices.

In some but not necessarily all embodiments, obtaining device type information of said one or more of the candidate devices comprises receiving the device type information via a respective near-field communication with said one or more of the one or more candidate devices.

In some but not necessarily all embodiments, obtaining device type information of said one or more of the candidate devices comprises scanning a respective bar code or QR code associated with said one or more of the one or more candidate devices.

In some but not necessarily all embodiments, the device type information indicates one or more of:
a wristwatch;
a personal communication device;
a computer screen; and
a television screen.

In some but not necessarily all embodiments, analyzing the selected image to detect device type information of the selected display screen image comprises analyzing an image in search of one or more non-display screen objects previously known to be associated with a type of display screen.

In some but not necessarily all embodiments, the one or more non-display screen objects are selected from one or more of:
an arm;
a desk; and
a previously known tag.

In some but not necessarily all embodiments, selecting the display screen from the one or more candidate display screens when said display screen is in the direction of gaze of the eye of the user comprises obtaining angle of arrival information of respective signals transmitted from the one or more candidate display screens. One of the candidate display screens is selected when the angle of arrival information of said one of the candidate display screens is in the direction of gaze of the eye of the user.

In some but not necessarily all embodiments, activating a display screen of a device further comprises using object recognition processing to detect that an image of one or more objects within a field of view of the user includes an image of a display screen, wherein said selecting is performed in response to a detection that the image of one or more objects within the field of view of the user includes the image of the display screen.

In some but not necessarily all embodiments, selecting the display screen comprises making a round-robin selection from among the one or more candidate display screens; and activating the display screen further comprises making a different round-robin selection and repeating the causing and activating actions when the confirmation code is not detected in the updated image of the selected display screen.

In some but not necessarily all embodiments, the confirmation code is displayed on the selected display screen for no more than 200 milliseconds.

In some but not necessarily all embodiments, activating the display screen further comprises detecting that the user's gaze is no longer directed at the selected display screen, and deactivating the selected display screen in response to said detection.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone, one or more programmed processors, or any combination of these). Moreover, the invention can additionally be considered to be embodied entirely within any form of nontransitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

An aspect of the herein-described technology involves detecting when a user is looking at a display device and activating the display device in response.

In another aspect, an activated device is deactivated when it is detected that a user is no longer looking at the device.

To take an example, a computer screen can be in an activated mode when it is detected that the user is looking at it, and can be forced to transition into an off/locked state when the user looks away from the screen or keyboard.

A similar procedure can be used for unlocking or locking, as well as activating and deactivating, a smartwatch, a personal handset or any other personal device. This can be done in one phase, in which the screen is both turned off and locked when the user is not looking, or in two phases—when the user is not looking, the display screen is turned off or shows a screen-saver or other active but not private content (e.g., a video, animated analog clock, etc.). In a second phase, the device can be made to automatically lock, for example if the user has moved away from the display or if the user has not looked at the device for some predefined amount of time. In another aspect of some alternative embodiments, the device can also be made to enter a low power state when the user is not looking at it.

In another exemplary embodiment, instead of a Smartwatch screen being turned on constantly, with a click on the screen or button, or when the arm is moved in a certain way, the screen is turned on only based on the user's gaze: when looked at by the user, the watch's screen is activated regardless of position or movements; otherwise it is turned off (to save power or for privacy).

In another alternative, the smartwatch screen can be configured to show an always-on image (e.g., a classic watch-style design), with or without being locked, and responding to a user looking at the screen by showing private contents or details and being unlocked for user interaction.

Figure 1:
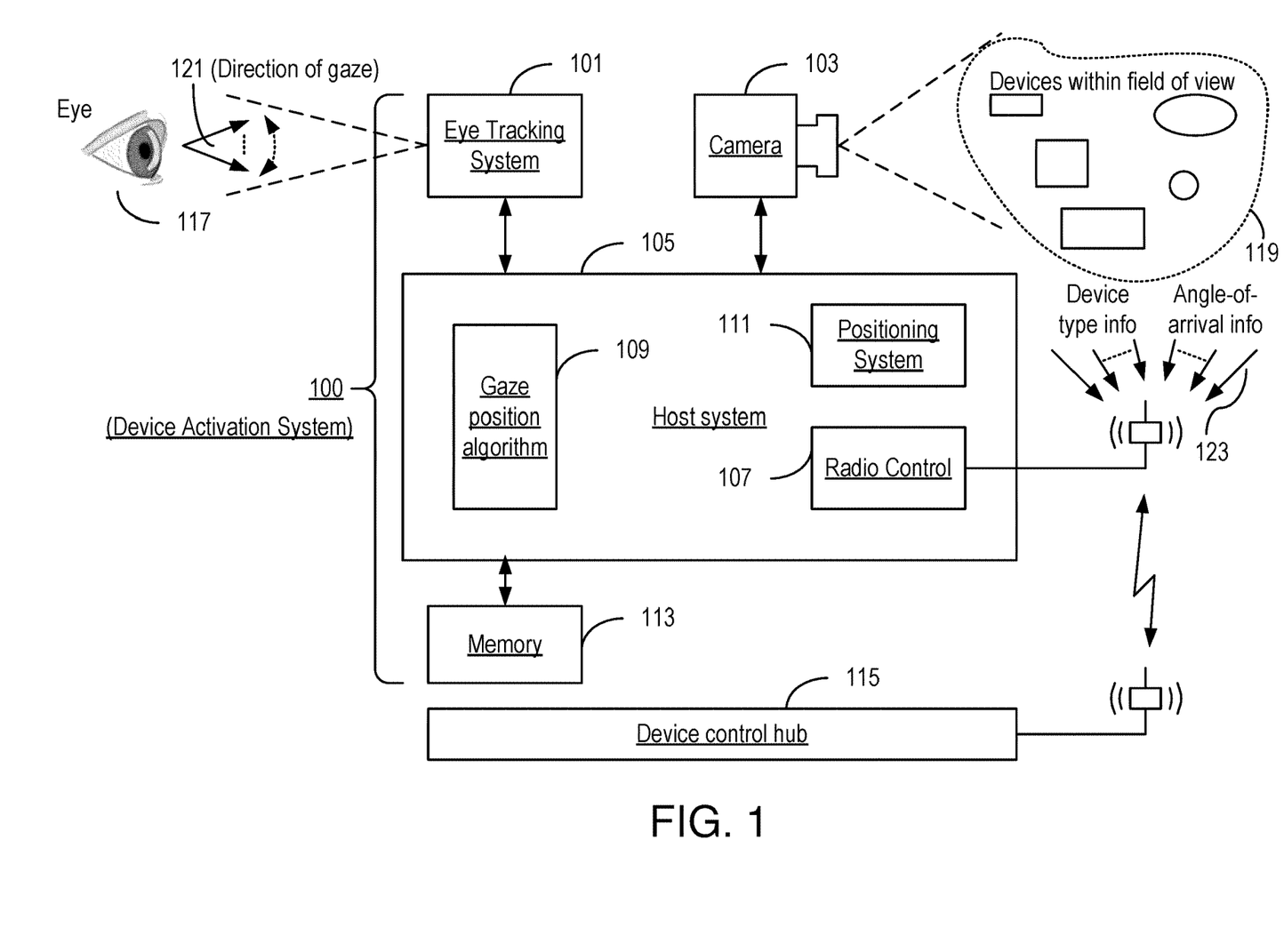
FIG. 1 is a block diagram of an exemplary device activation system in accordance with some, but not necessarily all, embodiments consistent with the invention.

FIG. 1 is a block diagram of an exemplary device activation system 100 in accordance with some, but not necessarily all, aspects of the technology. The system 100 includes an eye-tracking system 101 for tracking a direction of gaze 121 of a user's eyes 117. Eye-tracking systems are available commercially, and are well-known in the art. It is therefore unnecessary to explain here in detail how such systems operate.

The system 100 also includes a camera 103 that visually detects devices 119 within a field of view. The camera 103 can be a standard RGB camera or monochromic camera or other technology, and should be oriented in a direction that allows it to see candidate devices 119 that the user might be gazing at. The camera 103 can, for example, be mounted on a headset (not shown) that the user wears (e.g., such as eyeglasses or an AR or MR headset) so that the camera always faces in the same direction as the user.

The system 100 also includes a host system 105 that includes radio control equipment 107 configured to interact with a device control hub 115 of each candidate display screen 119 (to avoid cluttering the figure, only one device control hub 115 is shown; in practice, each candidate device 119 would be associated with a device control hub 115), a processor configured to carry out a gaze position algorithm 109, and a positioning system 111 for correlating the user's direction of gaze 121 with positions of the candidate devices 119 that the user might be looking at.

The host system 105 may further be supported by a memory 113 for storing data and logs.

Figure 2:
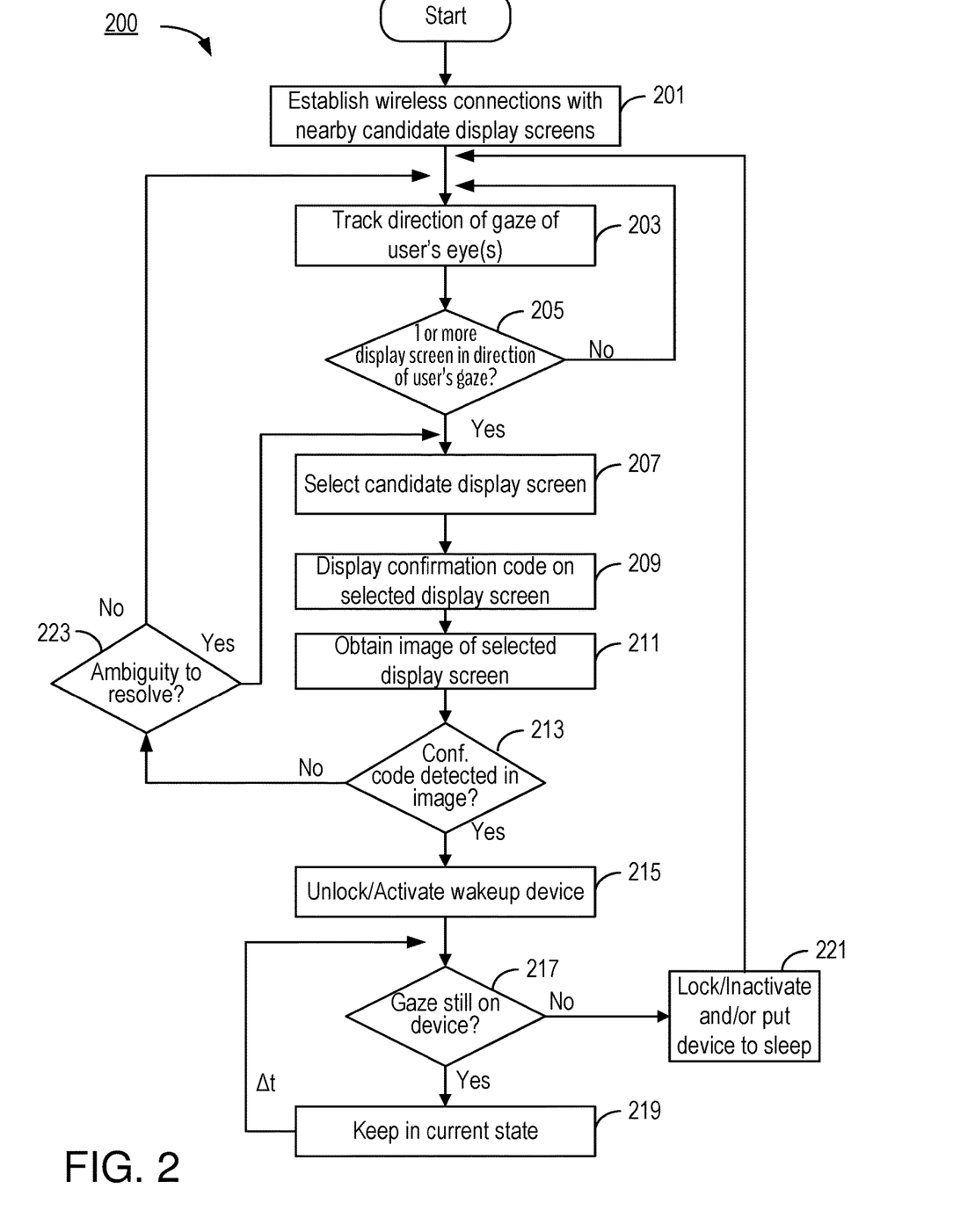
FIG. 2 is, in one respect, a flowchart of actions performed by a system in accordance with some, but not necessarily all embodiments consistent with the invention.

Additional aspects of the technology will now be described with reference to FIG. 2, which in one respect is a flowchart of actions performed by the system 100. In another respect, FIG. 2 can be considered to represent a flowchart of actions associated with a system 100 in accordance with a number of embodiments. In other respects, the blocks depicted in FIG. 2 can also be considered to represent means 200 (e.g., hardwired or programmable circuitry or other processing means) for carrying out the described actions.

The system 100 should be able to communicate with each of the candidate devices 119 through some mechanism. For example, short-range wireless communication (Bluetooth or Wi-Fi) can be used for this purpose, but the particular type of communication used in any given embodiment is not an essential aspect of the technology. The system 100 should at least be able to activate and/or deactivate a selected candidate device 119 by means of the communication mechanism.

Accordingly, the system 100 establishes some sort of connection (e.g., wireless connection) with nearby candidate display screens 119 (step 201). The connected devices form a pool of candidate devices 119 that the system 100 will be able to activate and/or deactivate based on the direction of the user's gaze.

Next, the system 100 tracks the direction of gaze 121 of the user's eyes 117 (step 203), and determines whether any one or more of the candidate display screens 119 is in the user's direction of gaze 121 (decision block 205). (There may be more than one candidate display screen in the user's direction of gaze 121 when, for example, one candidate display screen 119 is behind another one from the user's perspective—in such instances this is considered to be an ambiguity.) If no such candidate display screen 119 is detected ("No" path out of decision block 205), then in this exemplary embodiment the system 100 returns to again track the user's direction of gaze 121 and again test whether the user is looking at a particular one or more of the candidate devices 119. It will be observed that this "always-on" testing may be wasteful of power. Therefore, in alternative embodiments the tracking and testing of steps 203 and 205 are performed only after the system 100 first determines that there is at least one candidate device 119 that the user might be looking at.

Returning now to decision block 205, if it is detected that there is at least one candidate display screen 119 in the user's direction of gaze 121 ("Yes" path out of decision block 205) than the identified device is selected (step 207) (or one of the several identified devices is selected in case of ambiguity) and a confirmation code is caused (e.g., by means of the established communication connection) to be displayed on the selected display device (step 209).

In an aspect of some but not all embodiments of the technology, this can be made invisible to the user by displaying the confirmation code on the selected candidate display device for a very short period of time (one or a few frames lasting only a few 10's of milliseconds, e.g., 20 or 200 ms) just long enough to be detected by the camera 103 but not by the user. While the confirmation code is being displayed on the selected candidate display screen 119, an image of the selected display screen is obtained (step 211).

The system 100 then analyzes the image to determine whether the confirmation code can be detected (decision block 213). If not ("No" path out of decision block 213), then it is determined whether there had been an ambiguity (decision block 223). If not ("No" path out of decision block 223), processing reverts back to step 203 and the process is repeated (possibly, in some embodiments as mentioned above, with additional safeguards to avoid endlessly failing looping, which is wasteful of power and other resources). If there had been an ambiguity ("Yes" path out of decision block 223), then processing reverts to step 207 so that a different one of the candidate display screens 119 in the path of the user's gaze is selected and tested. In alternative embodiments, even if there had not been an ambiguity when no confirmation code was detected in the image, the system 100 might nonetheless make a new selection of another candidate display screen 119 (assuming that there is one) and display the confirmation code on the newly selected device. The system 100 will then again see if the confirmation code can be detected in an updated image of the candidate device.

It is further noted that instances may arise in which the user's gaze appears to be directed in the direction of one or more candidate display screens 119, and yet the system is unable to detect a displayed confirmation code on any of them. This circumstance can result in endless looping so long as circumstances remain unchanged, and this can be wasteful of power. Therefore, in some but not necessarily all embodiments, the system does not endlessly repeat the same tests. Instead, testing is paused until some other event is detected (e.g., a head movement or change in gaze direction) that would justify resumption of testing when it is again detected that the user's gaze 121 is in the direction of one or more candidate display screens 119.

If the confirmation code is detected in the selected candidate device ("yes" path out of decision block 213) then the selected display screen is unlocked and/or activated.

In an aspect of some but not necessarily all embodiments, the system 100 is further configured to detect whether or not the user's direction of gaze 121 is still on the now-activated device (decision block 217). If it is ("Yes" path out of decision block 217) than the now-activated device is kept in its current state (step 219) and after some time another check of the user's direction of gaze 121 is made.

But if the user is no longer gazing in the direction of the activated device ("No" path out of decision block 217) than the activated device is returned to its locked/inactivated state (or is otherwise put into some sleep mode) (step 221) and processing reverts back to initial tracking of the user's gaze at step 203.

Figure 3:
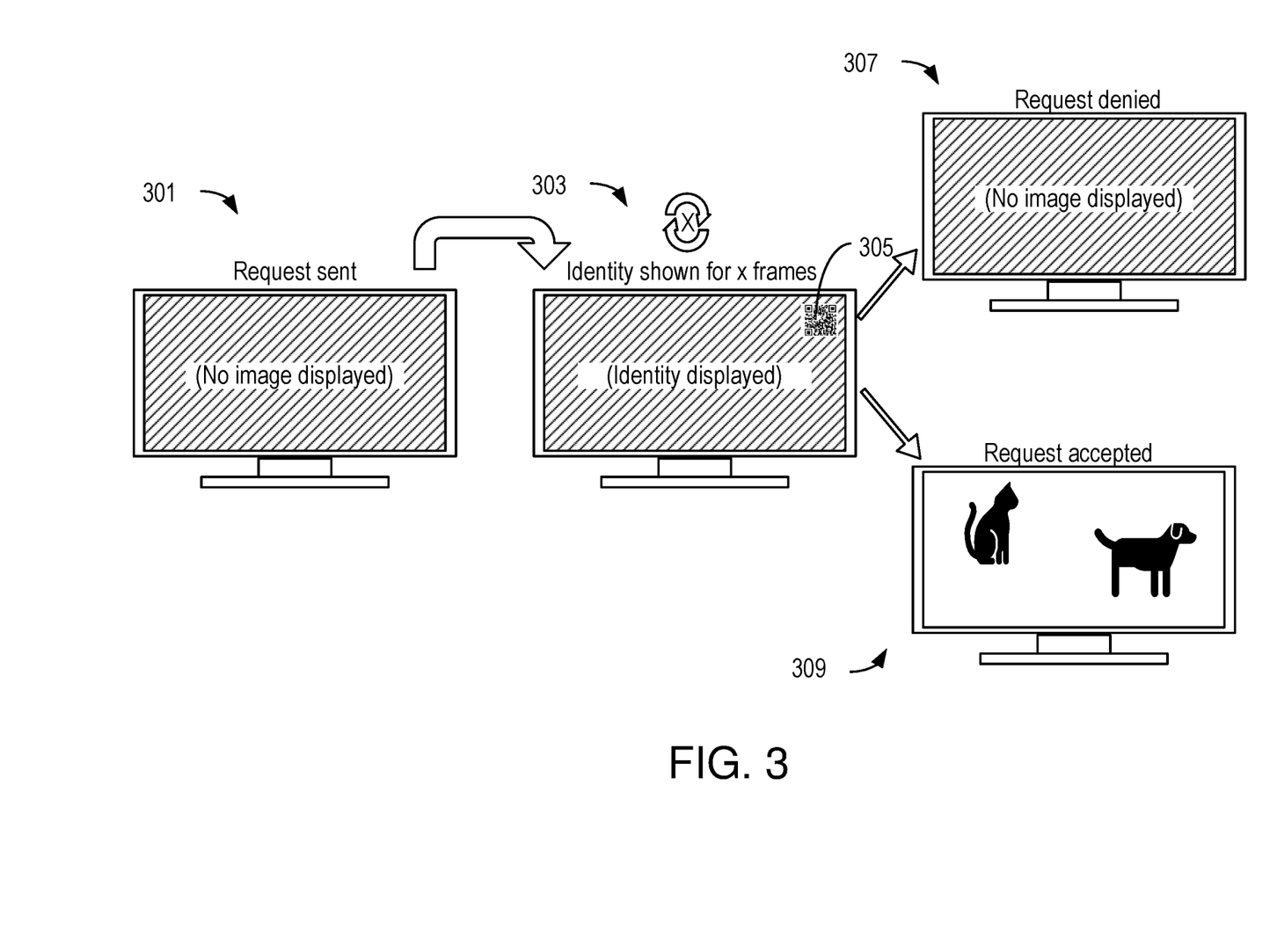
FIG. 3 illustrates the use of a displayed confirmation code on a selected display device, in accordance with some but not necessarily all embodiments consistent with the invention.

The strategy of steps 209, 211, 213, and 215, in which a confirmation code is used to confirm whether the correct display screen has been selected from the pool of candidate display screens is illustrated in FIG. 3. Initially, an exemplary display screen is in an inactive state 301, in which no image is displayed. In a next state 303, a confirmation code 305 is caused to be displayed on the screen. The exemplary display screen otherwise remains inactive. If the system 100 fails to detect the presence of the confirmation code 305 on the screen, then the screen remains inactive 307. But if the camera 103 of the system 100 does see the confirmation code 305 on the screen, then the display screen is transitioned into an active state 309 in which images from its associated device are shown.

The discussion will now focus on step 207, in which a candidate display screen is selected based on the direction of a user's gaze 121. This can be accomplished in a number of different ways, all of which are contemplated to be within the scope of the herein-described technology. In one exemplary embodiment, the camera 103 is used to obtain an image of devices within a field of view 119 of the user 117, and object recognition is used to identify which depicted objects are display screens (some may be other objects, e.g., desks, chairs, etc.). In particular, in one class of exemplary embodiments, the following actions are performed in order to activate a display screen of a device:

S1: establishing a connection with each of one or more candidate display screens;

S2: obtaining a field of view image comprising images of one or more display screens within the field of view of the user;

S3: tracking a direction of gaze of an eye of a user;

S4: selecting one of the images of the one or more display screens within the field of view of the user when said one of the images is in the direction of gaze of the eye of the user;

S5: using the selected one of the images to select a display screen from the one or more candidate display screens;

S6: causing a confirmation code to be displayed on the selected display screen and obtaining an updated image of the selected display screen; and S7: activating the selected display screen in response to detecting the confirmation code in the updated image of the selected display screen.

Regarding step S6, in order to achieve 100% certainty of confirmation, it is advantageous to ensure that each candidate display receive a command that causes it to display an image that differs from images shown on all other display devices. One of a number of possible ways of doing this is to cause each device to display an image that is, in some way, related to its identity over its connection (e.g., wireless connection) to the host system 105.

Figure 4:
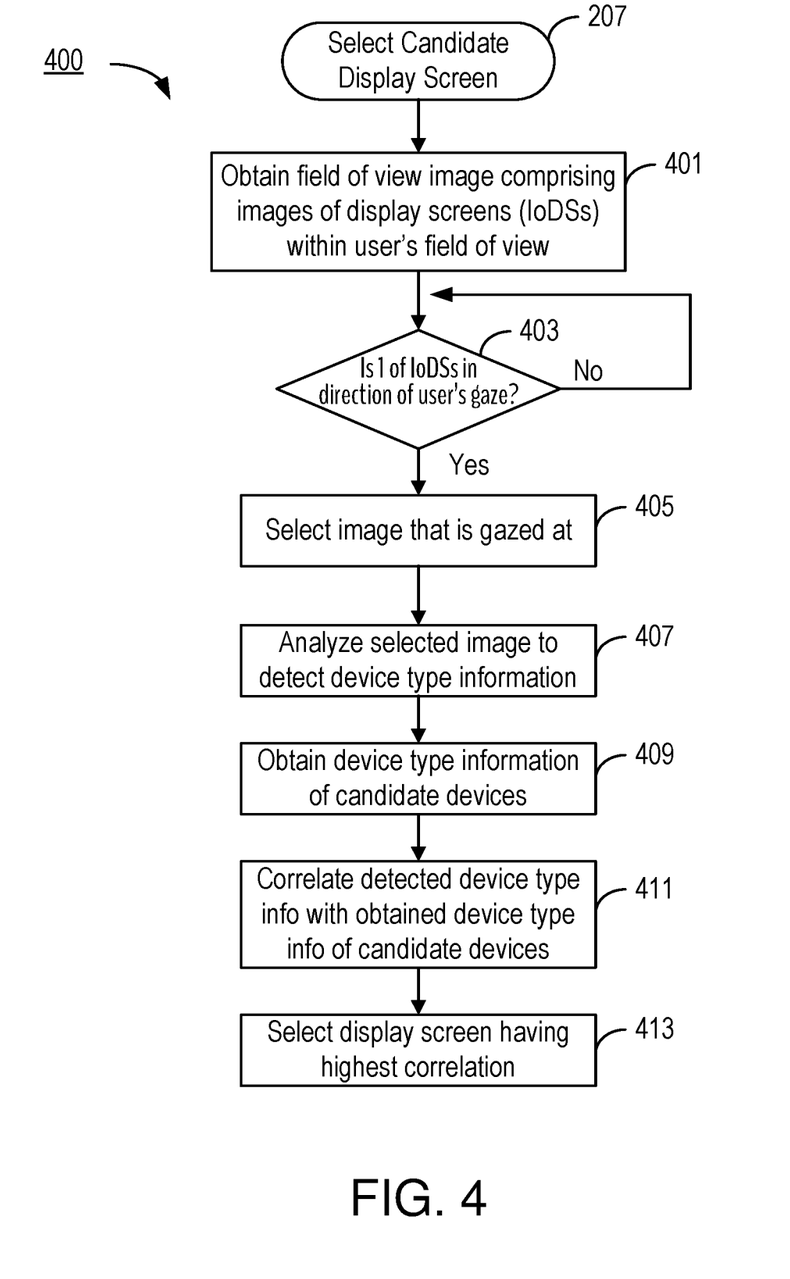
FIG. 4 is, in one respect, a flowchart of actions in accordance with some but not necessarily all embodiments consistent with the invention.

FIG. 4 is, in one respect, a flowchart of actions in accordance with an exemplary embodiment corresponding to step 207, in which a candidate display screen is selected based on the direction of a user's gaze 121, and also step S5 (using the selected one of the images to select a display screen from the one or more candidate display screens). In another respect, the blocks depicted in FIG. 4 can also be considered to represent means 400 (e.g., hardwired or programmable circuitry or other processing means) for carrying out the described actions.

The process begins by obtaining a field of view image comprising images of one or more display screens within a field of view 119 of the user (step 401). Each of these images occupies a different place within the field of view (some images may, of course, be overlapping). The locations of these images are tested to see whether they are within the user's direction of gaze 121 (decision block 403). Testing continues so long as none of the images satisfy this criterion ("No" path out of decision block 403). One of the images of the one or more display screens within the field of view of the user is selected when it is in the direction of gaze of the eye of the user ("Yes" path out of decision block 403; step 405).

The selected image is then analyzed to detect device type information of the selected display screen image (step 407). This can, for example, be accomplished by object recognition in which the type of display screen device (e.g., smartwatch, computer display, television) is detected from its image. In an aspect of some but not necessarily all embodiments, this detection can be aided or performed by recognizing non-display screen objects previously known to be associated with a type of display screen. For example, detecting an image of a user's arm can indicate the presence of a rectangular object on the arm is a watch display screen. Detecting an image of a desk may indicate the presence of the computer display screen. The object may also have some sort of previously known tag affixed to it that can be recognized in image. Those of ordinary skill in the art will recognize that many other examples are possible.

Also, either before or after this object recognition step, device type information of the one or more candidate devices is obtained (step 409) by some other mechanism. For example, a communication connection can be used to obtain this information directly from the device. Alternatively, a server or other type of hub may be accessed as a repository of device information for a particular location. In another exemplary alternative, the system 100 itself may be preprogrammed with device type information associated with the system's environment. These are nonlimiting examples; others are possible and are consistent with aspects of the inventive technology.

Next, the obtained device type information of the candidate devices is correlated with the detected device type information of the selected image (step 411) and a candidate display screen having a device type that is most correlated with the detected device type information of the selected display screen image is selected (step 413).

The processing as described above involves "always-on" testing which, as mentioned earlier, may be wasteful of power. Therefore, in alternative embodiments the tracking and testing of steps 203 and 205 are performed only after the system 100 first determines that there is at least one candidate device 119 that the user might be looking at.

Continuing with the discussion of step 207, in which a candidate display screen is selected based on the direction of a user's gaze 121, an alternative exemplary embodiment relies on the direction of signals emanating from each of the candidate devices 119. More particularly, exemplary embodiments utilize technology that is presently commercially available and that enables a short-range radio signal's angle of arrival to be detected at a receiver. For example, this feature is supported by current versions of technology that conforms to the Bluetooth® standards. It is noted, however that the use of Bluetooth® technology is not an essential aspect of embodiments consistent with the invention. In this class of exemplary embodiments, the following actions are performed in order to activate a display screen of a device:

S10: establishing a connection with each of one or more candidate display screens;

S11: obtaining angle of arrival information of respective signals transmitted from the one or more candidate display screens;

S12: tracking a direction of gaze of an eye of a user;

S13: selecting one of the candidate display screens when the angle of arrival information of said one of the candidate display screens is in the direction of gaze of the eye of the user;

S14: causing a confirmation code to be displayed on the selected display screen and obtaining an image of the selected display screen; and S15: activating the selected display screen in response to detecting the confirmation code in the updated image of the selected display screen.

Figure 5:
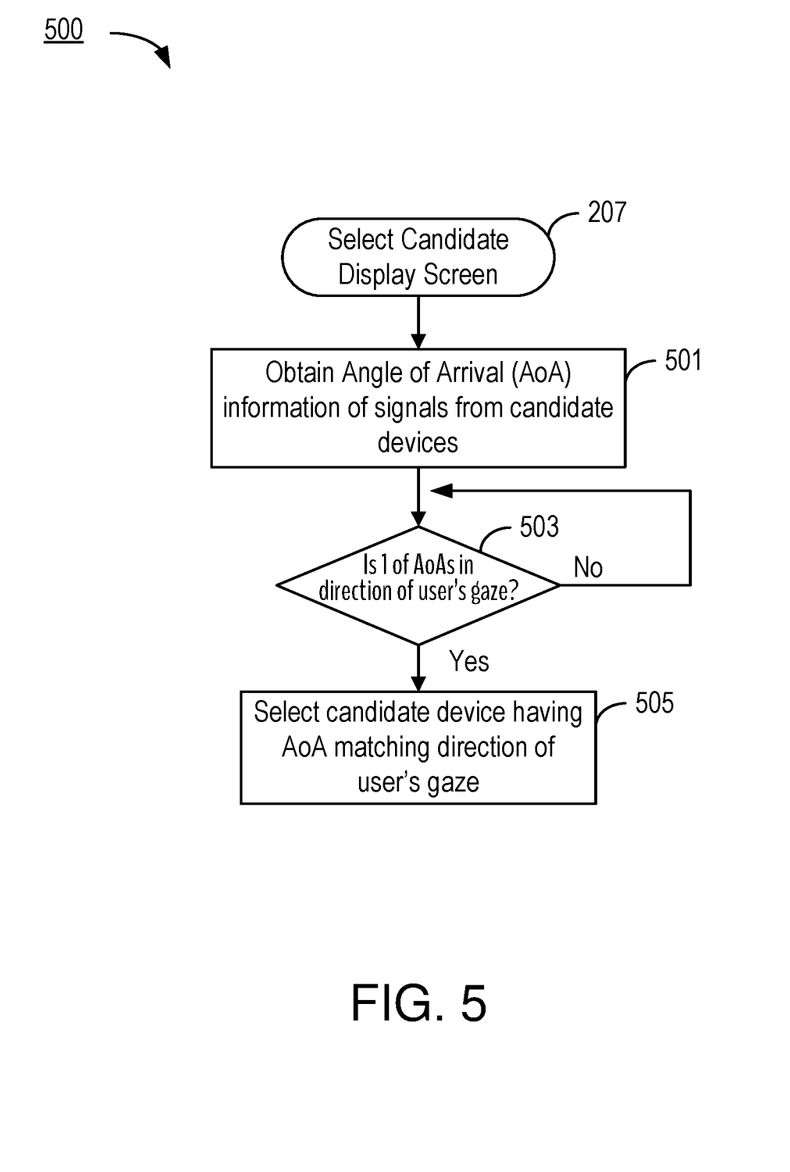
FIG. 5 is, in one respect, a flowchart of actions in accordance with some but not necessarily all embodiments consistent with the invention.

FIG. 5 is, in one respect, a flowchart of actions in accordance with an exemplary embodiment corresponding to step 207, in which a candidate display screen is selected based on the direction of a user's gaze 121, and also step S13 (selecting one of the candidate display screens when the angle of arrival information of that one of the candidate display screens is in the direction of gaze of the eye of the user;). In another respect, the blocks depicted in FIG. 5 can also be considered to represent means 500 (e.g., hardwired or programmable circuitry or other processing means) for carrying out the described actions.

The process begins by obtaining angle of arrival information 123 (see FIG. 1) of respective signals transmitted from the one or more candidate display screens 119 (step 501). It is expected that, in most instances, each device will have a unique signal angle of arrival. In those infrequent instances in which devices may be directly behind one another so that their signals arrive at the same angle, the user may be able to take steps to resolve the ambiguity (e.g., by moving an arm to take a watch display away from being in front of another display device).

Next, each device's angle of arrival information 123 is tested to see whether it is within the user's direction of gaze 121 (decision block 503). Testing continues so long as none of the images satisfy this criterion ("No" path out of decision block 503). One of the candidate display screens 119 is selected when its angle of arrival information 123 corresponds to the direction of gaze 119 of the eye 117 of the user ("Yes" path out of decision block 503; step 505).

Continuing with the discussion of step 207, in which a candidate display screen is selected based on the direction of a user's gaze 121, another alternative exemplary embodiment relies on a "brute force" way of selecting a candidate display device 119. More particularly, these embodiments include making a round-robin selection from among the one or more candidate display screens 119. The selection can be tested for correctness by using the confirmation code as described above. A different round-robin selection is made and confirmation code testing is repeated when the confirmation code is not detected on a previously selected device in an updated image of the selected display screen.

In yet another aspect of some but not necessarily all embodiments, the technology as described above can be combined with a privacy filter in the device to limit the field of view to the direction of the user. This would further enhance privacy.

The embodiments described above can be implemented with a camera device installed on any sort of conventional frame typically used for eyeglasses. However, the technology is not limited to use in environments in which a user sees an unaltered view of his or her environment. To the contrary, the principles described herein can readily be applied to technology that uses an augmented reality (AR) headset with associated processing support, or a modified reality (MR) headset with associated processing support. It will be recognized that in such embodiments, the user may be looking at candidate display devices 119 not through plain glass (or prescription lenses), but through or at some sort of display device. But the principle of tracking the user's gaze to detect which display screen user is looking at remains the same in all embodiments.

Figure 6:
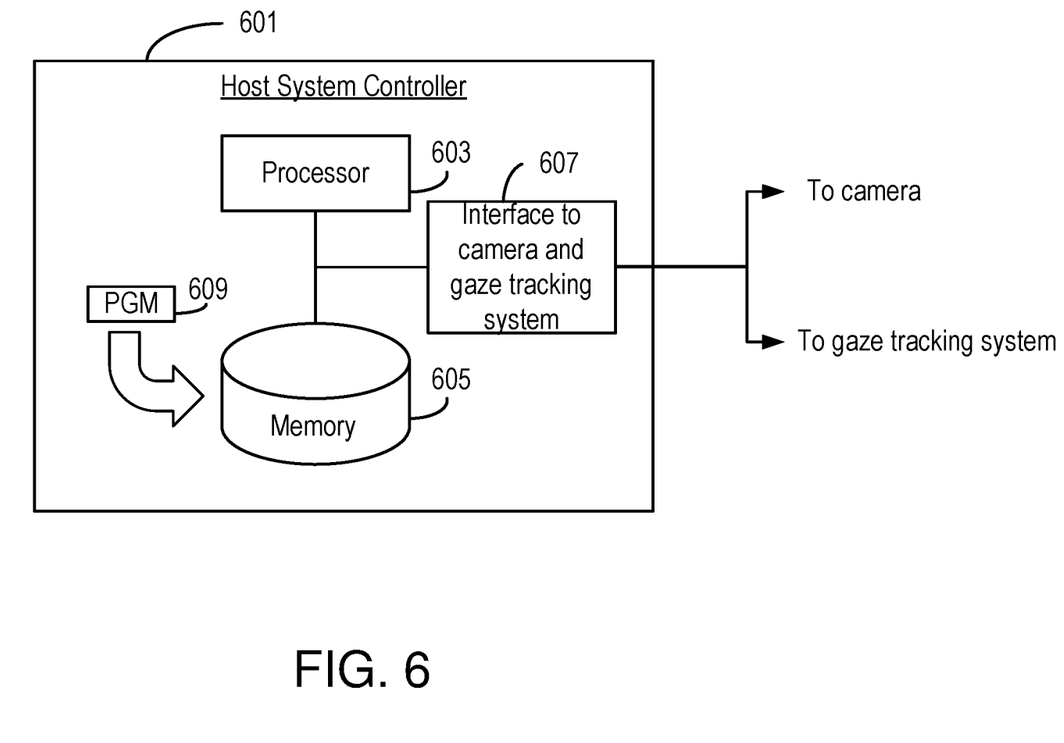
FIG. 6 illustrates an exemplary controller of a host system in accordance with some but not necessarily all exemplary embodiments consistent with the invention.

Aspects of an exemplary controller that may be included in the host system 105 to cause any and/or all of the above-described actions to be performed as discussed in the various embodiments are shown in FIG. 6, which illustrates an exemplary controller 601 of a host system 105 in accordance with some but not necessarily all exemplary embodiments consistent with the invention. In particular, the controller 601 includes circuitry configured to carry out any one or any combination of the various functions described above. Such circuitry could, for example, be entirely hardwired circuitry (e.g., one or more Application Specific Integrated Circuits—"ASICs"). Depicted in the exemplary embodiment of FIG. 6, however, is programmable circuitry, comprising a processor 603 coupled to one or more memory devices 605 (e.g., Random Access Memory, Magnetic Disc Drives, Optical Disk Drives, Read Only Memory, etc.) and to an interface 607 that enables bidirectional communication with other elements of the remote device (e.g., control interfaces of the one or more of the gaze tracking system 101 and camera 103). The memory device(s) 605 store program means 609 (e.g., a set of processor instructions) configured to cause the processor 603 to control other system elements so as to carry out any of the aspects described above. The memory device(s) 605 may also store data (not shown) representing various constant and variable parameters as may be needed by the processor 603 and/or as may be generated when carrying out its functions such as those specified by the program means 609.

Embodiments consistent with the invention provide a number of advantages over conventional technology. In one aspect ease of use is improved with respect to personal devices. In another respect, power is saved by not needing to expend power displaying information that the user is not looking at. Power is also saved by returning a display device to a power saving mode in response to detecting that the user is no longer gazing at it. Even when there are multiple devices in a user's environment, power is supplied to only one of them at a time.

Furthermore, by turning off the screen and potentially also locking it, the level of privacy and security is increased.

And unlike some conventional technology, the herein-described embodiments do not require that the display device itself include a camera to detect the presence of the user. This can be a major improvement when one considers that building a camera into a smartwatch can be problematic for usage in many situations.

The invention has been described with reference to particular embodiments. However, it will be readily apparent to those skilled in the art that it is possible to embody the invention in specific forms other than those of the embodiment described above. Thus, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

The invention claimed is:

1. A method of activating a display screen of a device, the method comprising:
  establishing respective connections with one or more candidate devices, wherein each candidate device comprises a candidate display screen;
  tracking a direction of gaze of an eye of a user;
  selecting a display screen from the one or more candidate display screens, based on the selected display screen being in the direction of gaze of the eye of the user;
  causing a confirmation code to be displayed on the selected display screen in a manner not detectable by the eye of the user, and obtaining an image of the selected display screen having the confirmation code displayed thereon; and
  activating the selected display screen from an off or locked state in response to detecting the confirmation code in the obtained image of the selected display screen.

2. The method of claim 1, wherein selecting the display screen from the one or more candidate display screens based on the selected display screen being in the direction of gaze of the eye of the user comprises:
  obtaining a field of view image comprising images of one or more candidate display screens within a field of view of the user;

selecting one of the images of the one or more candidate display screens within the field of view of the user, based on the selected image being in the direction of gaze of the eye of the user;

analyzing the selected image to detect device type information;

obtaining device type information of said one or more candidate devices; and correlating the obtained device type information with the device type information detected from the selected image; and selecting a candidate display screen associated with a device type that is most correlated with the device type information detected from the selected image.

3. The method of claim 2 wherein obtaining device type information of said one or more candidate devices comprises receiving the device type information via the respective connections with said one or more candidate devices.

4. The method of claim 2 wherein obtaining device type information of said one or more candidate devices comprises receiving the device type information via respective near-field communications with said one or more candidate devices.

5. The method of claim 2, wherein obtaining device type information of said one or more candidate devices comprises scanning respective bar codes or QR codes associated with said one or more candidate devices.

6. The method of claim 2, wherein the device type information indicates one or more of the following device types: a wristwatch, a personal communication device, a computer screen, and a television screen.

7. The method of claim 2, wherein analyzing the selected image to detect device type information comprises searching the selected image for one or more non- display screen objects previously known to be associated with a type of display screen.

8. The method of claim 7, wherein the one or more non-display screen objects include one or more of the following: an arm, a desk, and a previously known tag.

9. The method of claim 1, wherein selecting the display screen from the one or more candidate display screens based on the selected display screen being in the direction of gaze of the eye of the user comprises:

obtaining angle of arrival information of respective signals transmitted from the one or more candidate display screens or from the one or more candidate devices; and selecting the display screen from the one or more candidate display screens based on the angle of arrival information indicating that selected display screen is in the direction of gaze of the eye of the user.

10. The method of claim 1, wherein:

the method further comprises performing object recognition processing to detect that an image of one or more objects within a field of view of the user includes an image of a display screen; and selecting a display screen from the one or more candidate display screens is performed in response to a detection that the image of one or more objects within the field of view of the user includes the image of the display screen.

11. The method of claim 1, wherein:

selecting the display screen comprises making a round-robin selection of the display screen from among a plurality of the candidate display screens; and the method further comprises, when the confirmation code is not detected in the obtained image of the selected display screen:

making a round-robin selection of a different display screen from among the plurality of the candidate display screens;

causing a confirmation code to be displayed on the different display screen and obtaining an image of the different display screen having the confirmation code displayed thereon; and activating the different display screen from an off or locked state in response to detecting the confirmation code in the obtained image of the different display screen.

12. The method of claim 1, wherein the confirmation code is displayed on the selected display screen for no more than 200 milliseconds.

13. A host system configured to activate a display screen of a device, the host system comprising:

communication circuitry configured to communicate with one or more candidate devices, with each candidate device comprising a candidate display screen; and at least one processor operably coupled to the communication circuitry, where the at least one processor and the communication circuitry are configured to:

establish respective connections with the one or more candidate devices;

track a direction of gaze of an eye of a user;

select a display screen from the one or more candidate display screens, based on the selected display screen being in the direction of gaze of the eye of the user;

cause a confirmation code to be displayed on the selected display screen in a manner not detectable by the eye of the user, and obtain an image of the selected display screen having the confirmation code displayed thereon; and activate the selected display screen from an off or locked state in response to detecting the confirmation code in the obtained image of the selected display screen.

14. The apparatus of claim 13, wherein:

the host system further comprises an image sensor configured to obtain a field of view image comprising images of one or more candidate display screens within a field of view of the user; and the at least one processor and the communication circuitry are configured to select the display screen from the one or more candidate display screens based on the following:

select one of the images of the one or more candidate display screens within the field of view of the user, based on the selected image being in the direction of gaze of the eye of the user;

analyze the selected image to detect device type information;

obtain device type information of said one or more candidate devices; and correlate the obtained device type information with the device type information detected from the selected image; and select a candidate display screen associated with a device type that is most correlated with the device type information detected from the selected image.

15. The apparatus of claim 14, wherein the at least one processor and the communication circuitry are configured to obtain device type information of said one or more candidate devices based on receiving the device type information via the respective connections with said one or more candidate devices.

16. The apparatus of claim 14, wherein the at least one processor and the communication circuitry are configured to obtain device type information of said one or more candidate devices based on receiving the device type information via respective near-field communications with said one or more candidate devices.

17. The apparatus of claim 14, wherein the at least one processor and the communication circuitry are configured to obtain device type information of said one or more candidate devices based on scanning respective bar codes or QR codes associated with said one or more candidate devices.

18. The apparatus of claim 14, wherein the device type information indicates one or more of the following device types: a wristwatch, a personal communication device, a computer screen, and a television screen.

19. The apparatus of claim 14, wherein the at least one processor and the communication circuitry are configured to analyze the selected image to detect device type information based on searching the selected image for one or more non-display screen objects previously known to be associated with a type of display screen.

20. The apparatus of claim 19, wherein the one or more non-display screen objects include one or more of the following: an arm, a desk, and a previously known tag.

21. The apparatus of claim 13, wherein the at least one processor and the communication circuitry are configured to select the display screen from the one or more candidate display screens based on:
  obtaining angle of arrival information of respective signals transmitted from the one or more candidate display screens or from the one or more candidate devices; and
  selecting the display screen from the one or more candidate display screens based on the angle of arrival information indicating that selected display screen is in the direction of gaze of the eye of the user.

22. The apparatus of claim 13, wherein:
the at least one processor and the communication circuitry are further configured to perform object recognition processing to detect that an image of one or more objects within a field of view of the user includes an image of a display screen; and
the at least one processor and the communication circuitry are configured to select the display screen from the one or more candidate display screens in response to a detection that the image of one or more objects within the field of view of the user includes the image of the display screen.

23. The apparatus of claim 13, wherein:
the at least one processor and the communication circuitry are configured to select the display screen from a plurality of the candidate display screens based on a round- robin selection; and
the at least one processor and the communication circuitry are configured to, when the confirmation code is not detected in the obtained image of the selected display screen:
  make a round-robin selection of a different display screen from among the plurality of the candidate display screens;
  cause a confirmation code to be displayed on the different display screen and obtaining an image of the different display screen having the confirmation code displayed thereon; and
  activate the different display screen from an off or locked state in response to detecting the confirmation code in the obtained image of the different display screen.

24. The apparatus of claim 13, wherein the confirmation code is displayed on the selected display screen for no more than 200 milliseconds.

* * * * *